US012800242B2

(12) United States Patent
Gwon et al.

(10) Patent No.: US 12,800,242 B2
(45) Date of Patent: Nov. 17, 2026

(54) CONNECTOR

(71) Applicant: A. RAYMOND ET CIE, Grenoble (FR)

(72) Inventors: Hongseok Gwon, Hwaseong-si (KR); Jinsub Choi, Suwon-si (KR)

(73) Assignee: A. RAYMOND ET CIE, Grenoble (FR)

(*) Notice: Subject to any disclaimer, the term of this patent is extended or adjusted under 35 U.S.C. 154(b) by 61 days.

(21) Appl. No.: 17/660,298

(22) Filed: Apr. 22, 2022

(65) Prior Publication Data

US 2022/0349662 A1 Nov. 3, 2022

(30) Foreign Application Priority Data

Apr. 30, 2021 (FR) ....................................... 2104571

(51) Int. Cl.
*F28F 9/02* (2006.01)
*F16L 23/16* (2006.01)

(52) U.S. Cl.
CPC .......... *F28F 9/0258* (2013.01); *F16L 23/167* (2013.01); *F28F 2265/16* (2013.01)

(58) Field of Classification Search
CPC ..... F16L 23/167; F16L 21/03; F16L 2201/30; F16L 55/07; F16L 23/18
See application file for complete search history.

(56) References Cited

U.S. PATENT DOCUMENTS

| | | | | |
|---|---|---|---|---|
| 5,094,480 | A * | 3/1992 | Boileau | F16L 27/0804 285/190 |
| 5,170,659 | A * | 12/1992 | Kemp | F16L 23/167 137/557 |
| 5,203,592 | A * | 4/1993 | Takada | F16L 27/0828 285/281 |
| 5,545,242 | A * | 8/1996 | Whitlock | B01D 46/10 55/502 |
| 9,587,769 | B2 * | 3/2017 | Ishikawa | B60H 1/00571 |
| 12,158,225 | B2 * | 12/2024 | Young | F16L 27/0832 |
| 12,292,139 | B2 * | 5/2025 | Ekström | F16L 39/04 |
| 2005/0046180 | A1 | 3/2005 | Tombler et al. | |
| 2007/0051164 | A1 * | 3/2007 | Van Winkle | F16L 23/167 73/37 |
| 2013/0285369 | A1 * | 10/2013 | Gjerstad | F16L 23/167 285/119 |
| 2015/0152987 | A1 | 6/2015 | Ishikawa | |
| 2016/0116095 | A1 | 4/2016 | Oberdorfer et al. | |
| 2016/0281896 | A1 * | 9/2016 | Matteson | G01M 3/283 |
| 2022/0221084 | A1 * | 7/2022 | Huang | F16L 41/086 |

FOREIGN PATENT DOCUMENTS

| | | |
|---|---|---|
| JP | 2000320426 | 11/2000 |
| KR | 101891318 | 8/2018 |

OTHER PUBLICATIONS

French search report for FR2104571 dated Nov. 16, 2021.

* cited by examiner

*Primary Examiner* — James M Hewitt, II
(74) *Attorney, Agent, or Firm* — Perman & Green, LLP

(57) ABSTRACT

A connector for connecting to tubes, in particular to the cooling plate tubes, including a body having a first tubular portion and a flange on the outer circumference and at one end of the first tubular portion. The connector includes two circular or tubular seals which are spaced apart and arranged on an inner peripheral surface of the first tubular portion, in which, the connector includes a leakage channel formed between a leakage opening and the flange, the leakage opening being disposed between the seals.

7 Claims, 3 Drawing Sheets

CONNECTOR

CROSS-REFERENCE TO RELATED APPLICATIONS

This application claims priority to and the benefit of French patent application number FR2104571 filed on Apr. 30, 2021, the disclosure of which is incorporated herein by reference in its entirety.

BACKGROUND

Field

The present disclosure relates to a connector, in particular a structure to connect a pipe extending from a cooling plate inside a casing to a pipe located outside the casing. More particularly, the present disclosure relates to a quick connector between a cooling plate within an engine control unit and an external reserve tank including a heat transfer fluid.

BRIEF DESCRIPTION OF RELATED DEVELOPMENTS

It is important to manage the thermal aspect in electric and hybrid vehicles. The engine control unit of a hybrid vehicle is located in a casing in which a cooling plate is used to cool this control unit. For this purpose, a heat transfer liquid, such as water, circulates via a pipe between the cooling plate and an external source. It is necessary to guarantee the leakage performance of the connection between the pipe and the engine control unit ensured by a connector, in order to prevent the appearance of the heat transfer liquid in the casing. This type of connector is known from the state of the art.

The patent document US 2015/0152987 A1 describes a connection structure including a seal pipe which connects an inner pipe and an outer pipe, the internal pipe being connected to a cooling plate and an outer pipe. The device has a complex structure having several blanks. In addition, a possible damage to the O-ring located between the seal pipe and the inner pipe would make the connection defective. Furthermore, a quick connection is not engageable with this device. Another problem, it is necessary to provide assembly tolerances because the inner pipe and the outer pipe are separated by a gap.

SUMMARY

The present disclosure proposes a connector which allows connecting to tubes, in particular to the cooling plate tubes.

A first aspect of the present disclosure relates to a connector for connecting to tubes, including a body comprising a first tubular portion, a flange on the outer circumference and at one end of the first tubular portion, the connector comprises at least two circular or tubular seals which are spaced apart and arranged on an inner peripheral surface of the first tubular portion, in which the connector includes a leakage channel (50) which connects a leakage opening (23) and the flange (60), the leakage opening (23) being disposed between the seals (22, 24).

The present disclosure is advantageously implemented according to the embodiments and variants set out below, which are to be considered individually or according to any technically operative combination.

In one embodiment, the connector includes a spacer between the seals.

In one embodiment, the seals are O-rings.

In one embodiment, the connector includes an axial blocking element used to fasten a tube in the axial direction to which it is connected, an inner diameter of the first tubular portion being larger than an outer diameter of the tube.

In one embodiment, the axial blocking element is located between an end which is opposite to the flange of the first tubular portion and one of the joints closest to this end.

In one embodiment, the connector includes a second tubular portion disposed at the other flange surface opposite to the tubular portion, the two tubular portions forming a fluid passage, preferably, the two tubular portions being coaxial.

In one embodiment, the connector further includes two circular or tubular seals, preferably two O-rings, spaced apart and arranged on an inner peripheral surface 27 of the second tubular portion.

A second aspect of the present disclosure relates to a use of a connector according to the present disclosure in an engine control unit, characterised in that the first tubular portion and the leakage channel are located inside the engine control unit.

A third aspect of the present disclosure relates to a cooling system. This system includes a cooling plate and a coolant reservoir, the latter being connected by a connector.

A fourth aspect of the present disclosure relates to an electric vehicle inverter, the latter including a connector according to the present disclosure.

Advantageously, the connector according to the present disclosure has a simple structure, while maintaining high leakage performance even in the case of failure of a seal. Furthermore, it is possible to make a quick connection with the connector of the present disclosure. In addition, the connector includes a flange with which the connector can be fastened to the inner wall of a casing, thereby eliminating the assembly tolerances and maintaining airtight performance under severe temperature conditions.

DETAILED DESCRIPTION

Figure 1:
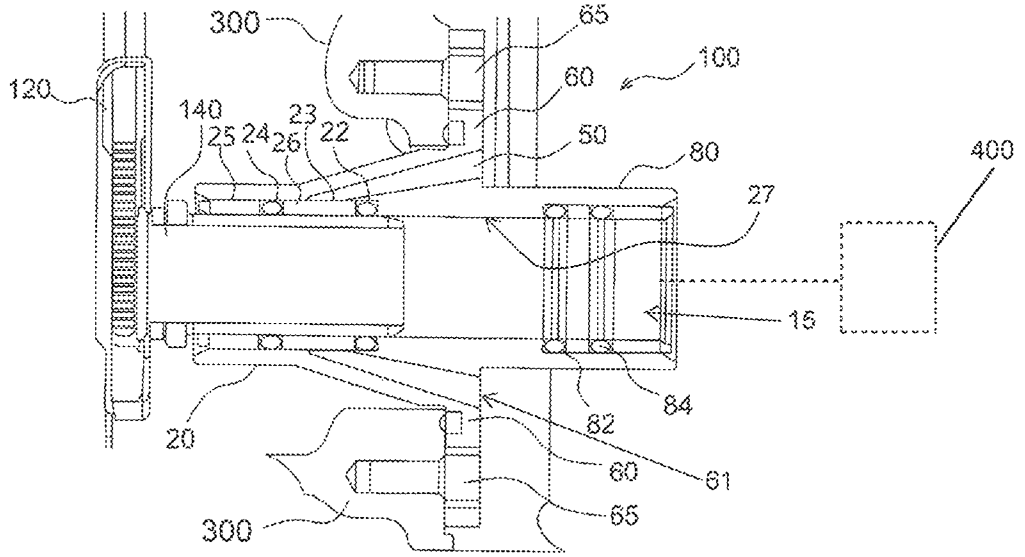
FIG. 1 represents a partial sectional view of a connector for an engine control unit.

The different figures as well as the elements of the same figure are not necessarily represented on the same scale. In all figures, the identical elements bear the same reference numeral.

The terminology used in the present description should in no way be interpreted in a limiting or restrictive manner, simply because it is used in conjunction with a detailed description of certain embodiments of the present disclosure.

FIG. 1 represents a view of an engine control unit including connectors 100 according to the present disclosure, from which the connectors 100 are linked to the cooling plates 120. The cooling plates are located, with the engine control unit, within a housing. The engine control unit is cooled by means of the cooling plates. A coolant or a heat transfer liquid, such as water, circulates between the cooling plates 120 and a tank 400. The cooling plates are provided with tubes 140 used as the inlet and outlet of the coolant. The tubes 140 can connect to a first tubular portion 20 of the connector 100. The connector 100 includes a flange 60 on the outer circumference and at one end of the first tubular portion 20. Thus, the connector can be fastened to the wall of the casing 300, for example by means of the bolts. The flange has two opposite through holes through which the bolts 65 fasten the flange 60 to the wall of the casing 300. It is essential that the leakage performance between the tubes 140 and the connector 100 are ensured in order to avoid the presence of liquid in the casing. On the other side of flange 60, connector 100 has an opening leading to the outside of the casing 300.

Indeed, FIG. 1 is a sectional view along the plane including the shaft of the first tubular portion 20 and the shaft linking the two through holes present on the flange 60. The connector 100 comprises two circular or tubular seals 22, 24 which are spaced apart and arranged on an inner peripheral surface 27 of the first tubular portion 20. The seals 22, 24 allow guaranteeing a sealing when the tube 140 is inserted into the first tubular portion 20. Advantageously, the connector 100 includes a leakage channel 50 formed between a leakage opening 23 and the flange 60, the leakage opening 23 being disposed between the seals 22, 24. When the first seal 22 fails, the coolant leaks through the opening 23 and then the leakage channel 50 to a channel opening (i.e., discharge opening 61) present on the flange 60, thus the leak flows entirely out of the casing 300. This arrangement advantageously allows ensuring a satisfactory leakage performance even upon the failure of the first seal 22.

In a preferred embodiment, the connector 100 includes a spacer 26 between the seals 22, 24. This spacer 26 allows keeping an axial distance between the seals 22, 24. The location of the spacer 26 corresponds to the leakage opening 23 located between the seals 22, 24, or the spacer 26 does not have the effect of plugging the leakage opening 23. This spacer 26 can be of tubular shape. Therefore, a possible leak can still flow through the leakage channel 50 despite the presence of this spacer 26.

Advantageously, the connector 100 has two opposite leakage channels 50.

In one embodiment, the flange 60 includes two through holes via which the connector 100 can be fastened to the wall of the casing 300 including holes for this purpose by means of bolts 65. Sealing means are advantageously provided between the flange 60 and the inner wall of the casing. This eliminates the assembly tolerances and maintains an airtight performance under severe temperature conditions.

In one embodiment, the connector includes an axial blocking element 25 which can fasten a tube 140 in the axial direction to which it is connected, an inner diameter of the first tubular portion 20 being larger than an outer diameter of the tube 140. The blocking element 25 ensures the connection between the connector 100 and the tube in the axial direction.

The tube forms a coolant inlet or outlet for the cooling plate 120. The tube 140 can be inserted into the first tubular portion 20.

In one embodiment, the connector 100 advantageously includes a second tubular portion 80 disposed at the other flange surface which is opposite to the tubular portion 80, the two tubular portions 20, 80 forming a fluid passage (i.e., the two tubular portions 20, 80 form a tubular shaft 15 having a jointless inner peripheral surface 27 as seen in FIG. 1 through which the fluid passes from one end to the other). Preferably, the two tubular portions 20, 80 are coaxial. This will be detailed later.

In one embodiment, the connector 100A further includes two circular or tubular seals 82, 84, preferably two O-rings, which are spaced apart and arranged on an inner peripheral surface 27 of the second tubular portion 80A.

Figure 2:
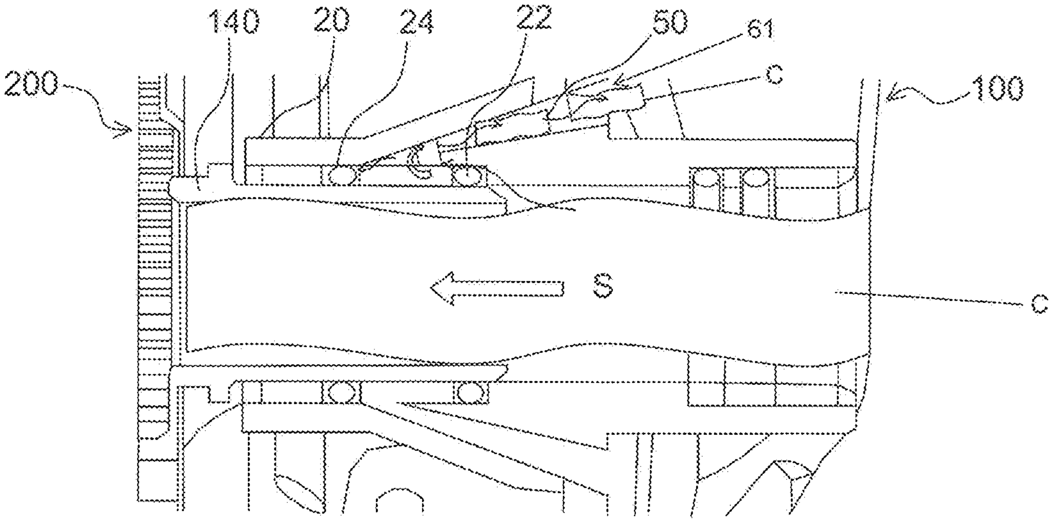
FIG. 2 represents another partial sectional view of the connector illustrated in FIG. 1, where a seal is defective.

FIG. 2 represents another partial sectional view of the connector 100 illustrated in FIG. 1 according to another embodiment, from which a first seal 22 is defective. In this embodiment, the coolant C circulates in the indicated direction S towards the cooling plate, by passing through the first tubular portion 20 and the tube 140. The first seal 22 being defective, the coolant C can enter the space formed between the first tubular portion 20 and the tube 140. Thanks to the opening 23 present on the first tubular portion 20, the leaking liquid flows through the channel 50. The leakage opening 23 advantageously located between the two seals 22, 24, the second seal therefore ensures the sealing functions between the first tubular portion 20 and the tube 140. The leaking liquid flows out of the casing 300 via openings provided at the flange and the wall of the casing 300. The coolant C can reach a high temperature in the fluid passage. At this temperature, the coolant C in vapour form can pass through the first seal 22 and appear between the two seals 22, 24, even if the first seal 22 is not completely defective. Advantageously, the coolant C in the form of vapour then exits through the channel 50. Therefore, this arrangement also allows reducing the pressure exerted on the second seal 24 when the first seal 22 fails or when the coolant C is present in the form of high temperature vapour between the two seals 22, 24.

In one embodiment, the connector 100 includes, between the seals 22, 24, a spacer 26 which allows separating the seals 22, 24, in particular on different sides of the leakage opening 23. As the spacer 26 does not have the effect of plugging the leakage opening 23, the leaking liquid can still flow through the leakage channel 50.

Figure 3:
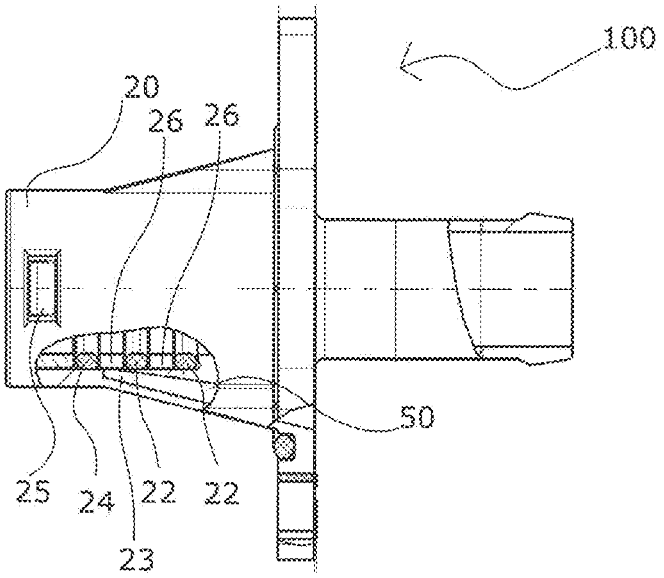
FIG. 3 represents another embodiment of the connector according to the present disclosure.

In one embodiment illustrated in FIG. 3, the connector 100 comprises a first tubular portion 20 which further comprises another first seal 22. Thus, the leakage opening 23 is disposed between the two first seals 22 and the second seal 24. Advantageously, the first additional seal 22 reinforces the sealing performance of the connector 100. Preferably, the connector 100 may include a spacer 26 as illustrated above and further, between the first seals 22, another spacer 26 which separate the first two seals 22. The other features may be the same as for the embodiment represented in FIG. 1.

Figure 4A:
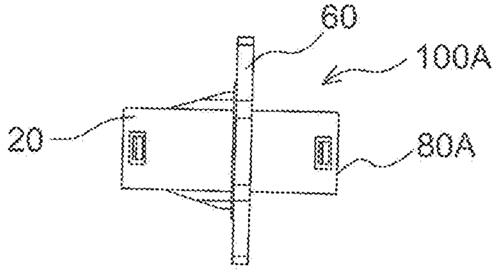
FIG. 4A represents an embodiment of the connector according to the present disclosure including a second female tubular portion and capable of connecting to a heat transfer liquid reservoir.

FIG. 4A represents an embodiment of the connector according to the present disclosure including a second female tubular portion and capable of connecting to a tank 400 of heat transfer liquid. The connector 100A includes third and fourth circular or tubular seals 82, 84. The seals 82, 84 are spaced apart and arranged on an inner peripheral surface 27 of the second tubular portion 80A. This connector 100A is capable of connecting to the coolant tank 400 which is provided with a female tube for this purpose.

Figure 4B:
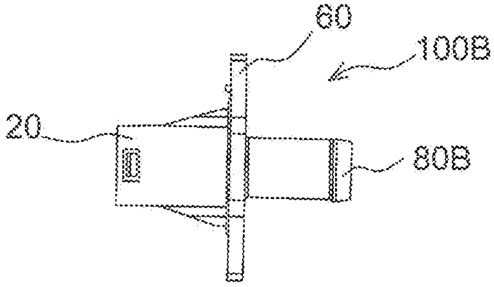
FIG. 4B represents an embodiment of the connector according to the present disclosure including a pipe as a second tubular portion.

FIG. 4B represents an embodiment of the connector 100B according to the present disclosure including a pipe as a second tubular portion 80B. The connector 100B having this configuration is capable of connecting to a flexible tube.

Figure 4C:
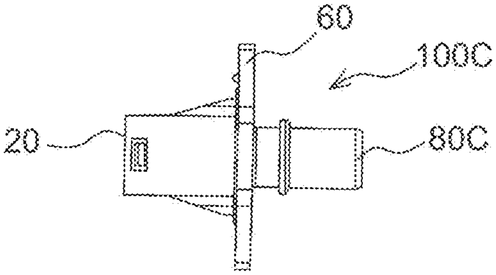
FIG. 4C represents an embodiment of the connector according to the present disclosure including a second male tubular portion.

FIG. 4C represents an embodiment of the connector 100C according to the present disclosure including a second male tubular portion 80C. The connector 100C according to this embodiment is capable of connecting to a female tube.

Advantageously, the connector according to the present disclosure has a high adaptability to connect to tubes of different types in order to form the coolant passage.

Figure 5:
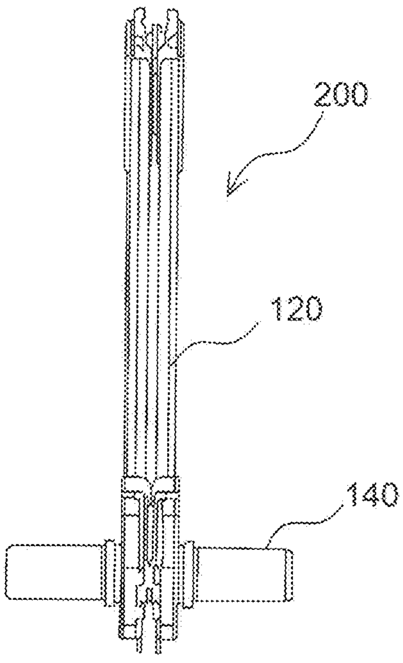
FIG. 5 represents a cooling plate provided with the pipes which are ready to be coupled with connectors according to the present disclosure.

FIG. 5 illustrates a cooling plate 120 provided with tubes 140 which are ready to connect with connectors 100, 100A, 100B, 100C according to the present disclosure. A quick connection can be engaged between the connector 100, 100A, 100B, 100C and a tube of the cooling plate.

The present disclosure also relates to an engine control unit including at least one connector 100; 100A; 100B; 100C. The first tubular portion 20 and the leakage channel 50 are located inside the engine control unit. The first tubular portion 20 is connected to a cooling plate which is also located within the engine control unit.

In one embodiment, the present disclosure relates to a cooling system, which includes a cooling plate 120 and a coolant tank 400, the latter being connected by a connector 100; 100A; 100B; 100C.

The present disclosure also relates to electric vehicle inverter, which includes a connector 100; 100A; 100B; 100C according to the present disclosure.

In general, the seals are preferably O-rings.

TABLE 1

LIST OF THE REFERENCE SIGNS

| References | Designations |
|---|---|
| 100; 100A; 100B; 100C | Cooling plate connector |
| 20 | First tubular portion, body |
| 22 | First O-ring |
| 23 | Leakage opening |
| 24 | Second O-ring |
| 25 | Axial blocking element |
| 26 | Spacer |
| 27 | inner peripheral surface |
| 40 | Deflector |
| 50 | Channel/Leakage opening/Orifice |
| 60 | Flange |
| 61 | discharge opening |
| 65 | Bolt |
| 80; 80A; 80B; 80C | Second tubular portion |
| 82 | Third O-ring |
| 84 | Fourth O-ring |
| 120 | Cooling plate |

TABLE 1-continued

LIST OF THE REFERENCE SIGNS

| References | Designations |
|---|---|
| 140 | Cooling plate connection tube (heat transfer) |
| 300 | Engine control unit |
| C | coolant |
| S | direction |

What is claimed is:

1. A connector for connecting to tubes comprising:

a unitary body having:

a substantially tubular shaft with a jointless inner peripheral surface extending through the unitary body forming a fluid passage, and a flange on the outer circumference of a portion of the unitary body, the flange having apertures therein being configured for locating fasteners to fasten the connector to an apparatus;

at least two circular or tubular seals which are spaced apart and arranged on the inner peripheral surface of the tubular shaft; and a leakage channel which connects a leakage opening in the tubular shaft to a discharge opening through the flange, the leakage opening being disposed between the at least two circular or tubular seals, wherein the at least two circular or tubular seals are fully contained within the tubular shaft of the unitary body.

2. The connector according to claim 1, wherein the connector includes a spacer between the at least two circular or tubular seals, the location of the spacer corresponding to the leakage opening.

3. The connector according to claim 1, wherein the connector includes an axial blocking element used to fasten a tube in the axial direction to which it is connected, an inner diameter of the tubular shaft being larger than an outer diameter of the tube.

4. The connector according to claim 3, wherein the axial blocking element is located between an end which is opposite to the flange of the tubular shaft and one of the at least two circular or tubular seals closest to the end.

5. The connector according to claim 1, further comprising a second leakage channel having a second leakage opening disposed between the at least two circular or tubular seals, the second leakage channel extending from the second leakage opening to a second discharge opening through the flange.

6. A cooling system, including a cooling plate connected to a connector according to claim 1.

7. The connector according to claim 5, wherein the second leakage channel is disposed so as to be opposite from the leakage channel in the tubular shaft.

* * * * *